United States Patent [19]

Patel et al.

[11] Patent Number: 5,981,651
[45] Date of Patent: Nov. 9, 1999

[54] INK PROCESSES

[75] Inventors: Raj D. Patel, Oakville, Canada; Grazyna E. Kmiecik-Lawrynowicz, Fairport, N.Y.; Michael A. Hopper, Toronto; Walter Mychajlowskij, Georgetown, both of Canada

[73] Assignee: Xerox Corporation, Stamford, Conn.

[21] Appl. No.: 08/922,078

[22] Filed: Sep. 2, 1997

[51] Int. Cl.$^6$ ........................................ C08F 2/00
[52] U.S. Cl. .............................. 524/773; 526/78
[58] Field of Search ............................ 523/322, 334, 523/335; 524/773

[56] References Cited

U.S. PATENT DOCUMENTS

| | | | |
|---|---|---|---|
| 4,003,871 | 1/1977 | Costanza | 524/836 |
| 4,251,824 | 2/1981 | Hara et al. | 346/140 R |
| 4,410,899 | 10/1983 | Haruta et al. | 346/140 R |
| 4,601,777 | 7/1986 | Hawkins et al. | 156/626 |
| 4,705,567 | 11/1987 | Hair et al. | 106/20 |
| 4,797,339 | 1/1989 | Maruyama et al. | 430/109 |
| 4,877,451 | 10/1989 | Winnik et al. | 106/23 |
| 4,938,488 | 7/1990 | Udagawa et al. | 277/235 B |
| 4,996,127 | 2/1991 | Hasegawa et al. | 430/109 |
| 5,120,361 | 6/1992 | Winnik et al. | 106/22 |
| 5,145,518 | 9/1992 | Winnik et al. | 106/21 |
| 5,254,159 | 10/1993 | Gundlach et al. | 106/22 H |
| 5,256,193 | 10/1993 | Winnik et al. | 106/21 A |
| 5,271,764 | 12/1993 | Winnik et al. | 106/21 A |
| 5,278,020 | 1/1994 | Grushkin et al. | 430/137 |
| 5,290,654 | 3/1994 | Sacripante et al. | 430/137 |
| 5,308,734 | 5/1994 | Sacripante et al. | 430/137 |
| 5,344,738 | 9/1994 | Kmiecik-Lawrynowicz et al. | 430/137 |
| 5,346,797 | 9/1994 | Kmiecik-Lawrynowicz et al. | 430/137 |
| 5,364,729 | 11/1994 | Kmiecik-Lawrynowicz et al. | 430/137 |
| 5,366,841 | 11/1994 | Patel | 523/322 |
| 5,370,963 | 12/1994 | Patel et al. | 430/137 |
| 5,403,693 | 4/1995 | Patel et al. | 430/137 |
| 5,418,108 | 5/1995 | Kmiecik-Lawrynowicz et al. | 430/137 |
| 5,627,004 | 5/1997 | Grushkin | 523/335 |
| 5,645,968 | 7/1997 | Sacripante | 523/335 |
| 5,650,255 | 7/1997 | Ng | 523/334 |
| 5,650,256 | 7/1997 | Veregin | 523/335 |
| 5,683,847 | 11/1997 | Patel | 430/137 |

Primary Examiner—Paul R. Michl
Attorney, Agent, or Firm—E. O. Palazzo

[57] ABSTRACT

A process comprising (1) polymerizing an organic phase of monomer in the presence of a carboxylic acid, an oil soluble chain transfer agent, and a partially water soluble chain transfer agent; and which polymerizing is accomplished in the presence of (2) an aqueous phase containing a nonionic surfactant, and an anionic surfactant, and wherein there is added to the aqueous phase an aqueous initiator solution of an inorganic persulfate, and wherein the resulting latex contains particles of polymer with carboxylic acid; aggregating said latex particles with colorant; thereafter adding an effective amount of anionic surfactant and heating the mixture resulting about equal to, or about above the polymer Tg resulting from said monomer, or said monomers.

25 Claims, No Drawings

INK PROCESSES

BACKGROUND OF THE INVENTION

The present invention is generally directed to aqueous ink compositions. More specifically, the present invention is directed to colored, especially pigmented aqueous ink compositions particularly suitable for use in ink jet printing processes, and especially thermal ink jet processes. In embodiments, the present invention is directed to processes for the preparation of anionically charged latexes with properties that enable the breakdown, or reduction in size of formed aggregates of latex and colorant, especially pigment particles upon aggregation and coalescence to provide submicron to micron sized pigmented particles in the size range of, for example, from about 0.3 to about 2, or about 1.5 microns (volume average throughout) as measured by a disk centrifuge.

The present invention is specifically directed to the preparation of latexes by, for example, batch or semibatch emulsion polymerization processes, wherein the parameters, such as temperature, monomer composition, chain transfer agent (CTA) type and concentration, and type and concentration of surfactant, permit products with colloidal or surface properties that result in submicron pigmented particles when aggregated and coalesced. The process for the preparation of an anionically charged latex comprised of resin, or polymer particles suspended in water, involves the mixing and selection of a suitable latex, and a water soluble initiator, which initiator provides for the majority of the surface charge on the latex. The charge is not believed to be primarily directed by the oil soluble initiator which is less ionic. The latex is combined with a dispersion of colorant, especially pigment, in an aqueous mixture containing an aqueous surfactant, such as a cationic surfactant, which surfactant is present in suitable amounts, such as for example, from about 0.5 weight percent throughout unless otherwise indicated, to about 10 percent and shearing this mixture in the presence of the latex mixture comprised of suspended submicron resin particles of from, for example, about 0.01 to about 0.8 micron in volume average diameter in an aqueous solution containing anionic surfactant, which surfactant is selected, for example, in an amount of from about 0.5 percent to about 10 percent, and nonionic surfactants selected in amounts of from about 0.02 percent to about 10 weight percent. The resultant mixture comprised of a flocculation of polymer, or resin and colorant, especially pigment particles, is then vigorously mixed with a high speed shearing device, followed by heating at, for example, from about 5 to about 40° C. below the resin, or polymer Tg resulting in the formation of electrostatically bound aggregates of from about 0.5 to about 5 microns in volume average diameter, and which particles are comprised of colorant, such as pigment and polymer, followed by the optional, but preferable addition of a surfactant or stabilizer, and thereafter, heating the formed aggregates above about the polymer Tg, wherein the formed aggregates breakdown, or are separated and reduced to particles of resin and colorant suitable for ink jet inks. Breakdown refers to a change, especially reduction in size, or separation of the formed aggregates into about submicron to about micron sized particles containing colorant, wherein the size thereof is, for example, in the range of from about 0.3 to about 2.5 microns and preferably in the range of from about 0.3 to about 1.5 microns.

The present invention is further directed to processes wherein the amount of anionic surfactant, the type of anionic surfactant, the concentration of the water soluble initiator, the concentration of the chain transfer agent, such as carbon tetrabromide, and the amount of acrylic acid or methacrylic acid results in latexes with certain properties which when aggregated and coalesced result in a breakdown of the aggregates to submicron colorant, such as pigmented particles suitable for ink jet processes.

The latex can be prepared by batch or semibatch polymerization processes, wherein in the batch polymerization process the addition of (1) an organic phase comprised of monomers, such as styrene, butyl acrylates, methacrylates, and the like, an oil soluble CTA (charge transfer agent), such as dodecanethiol, and the partial water soluble component, such as carbon tetrabromide and the acrylic or methacrylic acid, to (2) an aqueous phase containing an anionic surfactant, such as sodium dodecylbenzene sulfonate (SDBS), and a nonionic surfactant, such as nanophenol ethoxylates, for example ANTAROX 897™, and emulsified for an effective period of time, for example from about 5 to about 20, and preferably about 10 minutes, prior to the addition of the initiator, such as potassium or ammonium persulfate and mixed, followed by polymerizing the monomers at a suitable temperature, for example, by heating at from about 60° C. to about 80° C. for a period of, for example, from about 6 to about 8 hours. The semibatch polymerization can provide greater process latitude for synthesizing custom latexes suitable for ink jet applications, primarily since, for example, a fraction of the organic and aqueous phases are added initially and the remainder is added over a period of time during the polymerization. Therefore, a greater control on the monomer composition, the distribution of the acrylic acid, the charge of the latex particles, and the like can be readily obtained since the feed composition to the reactor composition can be custom tailored to provide suitable ink requirements. Furthermore, the type of anionic surfactant at relatively the same concentration, for example from about 0.5 weight percent to about 10 percent, or parts can also result in the formation of submicron pigmented particles suitable for ink jet applications during coalescence by the known emulsion/aggregation processes, reference for example the patents recited herein.

In embodiments, the present invention also resides in processes for the preparation of submicron colorant, such as pigmented particles, wherein the latex possesses a zeta potential of from about −85 to about −120 millivolts (mV) and contains submicron resin particles, anionic, such as NEOGEN R™, and nonionic surfactant, such as ANTAROX 897™, and is blended together with a colorant, especially pigment dispersion containing submicron pigment particles and cationic surfactant, such as SANIZOL B™, at speeds of from about 500 to about 5,000 rpm, where the zeta potential of the blend formed is in the range of from about −45 to about −55 mV, followed by heating the mixture to a suitable temperature of, for example, from about 5 to about 20 degrees below the resin Tg to form aggregates of pigment and resin particles having a size of from about 0.5 to about 5 microns in volume average diameter. Anionic stabilizer is then added to the mixture to increase the zeta potential of the aggregates to from about −75 to about −90 mV, and the temperature of the mixture is increased to from about 5 to about 50 degrees above the resin Tg, resulting in a breakdown of the aggregates into colorant, such as pigmented particles suitable for thermal ink jet methods.

Embodiments of the present invention also include the elimination of the anionic surfactant which is added to the aggregates and prior to coalescence by modifying the surface or colloidal properties thereof and wherein such latexes when aggregated result in a zeta potential which is equal to that of the mixture that contained the additional anionic stabilizer, which when coalesced also results in an aggregate reduction, or breakdown; a process for the preparation of latexes which have surface colloidal properties suitable for the formation of submicron pigmented particles wherein the desired surface colloidal properties are obtained by the manipulation of processing conditions, such as (i) the sequence of addition of the monomers;

(ii) concentration of the components utilized;

(iii) the concentration of the carboxylic acid utilized, which is, for example, from about 3 to about 20 weight percent of the monomers and preferably in the range of about 5 to about 15 percent;

(iv) the type, the concentration and the purity of the anionic surfactant, such as sodium dodecyl benzene sulfonate, which can be either linear or branched; and/or (v) the ratio of the carboxylic acid, such as acrylic acid or methacrylic acid, to the partially soluble water chain transfer agent, such as carbon tetrabromide, and which ratio is, for example, greater than about 1:0.5 by weight percent of the monomers; and wherein the monomers are polymerized in a nonionic/anionic surfactant solution utilizing a water soluble initiator, such as an inorganic persulfate such as ammonium persulfate, and an optional organic soluble initiator, such as an azobis compound, and wherein there results a resin with a weight average molecular weight of from about 10,000 to about 60,000 and preferably in the range of from about 20,000 to about 40,000, and a Tg of between about 20° C. and about 60° C., and preferably in the range of from about 25° C. to about 50° C.; whereupon such latexes when aggregated with submicron colorant, such as pigment particles, result in particle sizes of about 3 to about 5 microns; which when stabilized with an anionic surfactant to primarily retain the particle size of the aggregates upon further heating rather results in a breakdown of the preformed aggregates into colorant, such as pigmented particles, with a size diameter of from about 0.3 to about 2 microns, and which particles are, suitable for ink jet inks.

In another embodiment thereof, the present invention is directed to an in situ process comprised of first dispersing a colorant, especially pigment, such as SUNSPERSE BLUE™, in an aqueous mixture containing a cationic surfactant, such as dodecyl benzyl, dimethyl ammonium chloride (SANIZOL B-50™), utilizing a high shearing device, such as a Brinkmann Polytron, microfluidizer or sonicator, thereafter shearing this mixture with a latex prepared as illustrated herein and comprised of suspended resin particles, such as poly(styrene butadiene acrylic acid), poly(styrene butylacrylate acrylic acid) or poly(styrene isoprene acrylic acid), and which particles are, for example, of a size ranging from about 0.01 to about 0.5 micron in volume average diameter as measured by the Brookhaven nanosizer or a Disk Centrifuge in an aqueous surfactant mixture containing an anionic surfactant, such as sodium dodecylbenzene sulfonate (for example NEOGEN R™ or NEOGEN SC™), and a nonionic surfactant, such as alkyl phenoxy poly(ethyleneoxy)ethanol (for example IGEPAL 897™ or ANTAROX 897™), thereby resulting in a flocculation, or heterocoagulation of the resin particles with the pigment particles; and which, on further stirring for from about 1 to about 3 hours while heating, for example, from about 35 to about 45C, results in the formation of statically bound aggregates ranging in size of from about 0.2 micron to about 1.5 microns in average diameter size as measured by the Disk Centrifuge, where the size of the aggregated particles and their distribution can be controlled by the temperature of heating, for example from about 5° C. to about 25° C. below the resin Tg. Thereafter, there is added a colloidal stabilizer, such as additional anionic surfactant like sodium dodecylbenzene sulfonate (for example NEOGEN R™ or NEOGEN SC™), in an amount of, for example, from about 0.2 to about 2 percent by weight of the aggregate suspension to prevent, or minimize further growth of the aggregates and heating the aggregate suspension from about 5° C. to about 50° C. above the resin Tg to provide for particle fusion or coalescence of the polymer and pigment particles yielding a suspension of pigmented latex composite particles in which various particle size diameters can be obtained, such as from about 0.1 to about 3, from about 0.2 to 1.5 microns, or submicron, that is about 1 micron, or less in volume average particle diameter. The aforementioned particle dispersions are especially useful for ink jet printing of colored images with excellent line and solid resolution.

While not being desired to be limited by theory, it is believed that the flocculation or heterocoagulation is caused by the partial neutralization of the colorant, such as pigment mixture containing the pigment and cationic surfactant absorbed on the pigment surface with the resin mixture containing the resin particles and anionic surfactant absorbed on the resin particles.

In another embodiment thereof, the present invention is directed to an in situ process comprised of first dispersing a pigment, such as SUNSPERSE BLUE™, in an aqueous mixture containing a cationic surfactant, such as dodecyl benzyl, dimethyl ammonium chloride (SANIZOL B-50™), utilizing a high shearing device, such as a Brinkmann Polytron, microfluidizer or sonicator, thereafter shearing this mixture with a latex prepared as illustrated herein and comprised of suspended resin particles, such as poly(styrene butadiene acrylic acid), poly(styrene butylacrylate acrylic acid) or poly(styrene isoprene acrylic acid), and which particles are, for example, of a size ranging from about 0.01 to about 0.5 micron in volume average diameter as measured by the Brookhaven nanosizer or a Disk Centrifuge in an aqueous surfactant mixture containing an anionic surfactant, such as sodium dodecylbenzene sulfonate (for example NEOGEN R™ or NEOGEN SC™), and nonionic surfactant, such as alkyl phenoxy poly(ethyleneoxy)ethanol (for example IGEPAL 897™ or ANTAROX 897™), thereby resulting in a flocculation, or heterocoagulation of the resin particles with the pigment particles; and which, on further stirring for about 1 to about 3 hours while heating, for example, from about 35° C. to about 45° C., results in the formation of statically bound aggregates ranging in size of from about 0.2 micron to about 1.5 microns in volume average diameter size as measured by the Disk Centrifuge, where the size of the aggregated particles and their distribution can be controlled by the temperature of heating, for example, from about 5° C. to about 25° C. below the resin Tg, and thereafter, adding a colloidal stabilizer, such as additional anionic surfactant such as sodium dodecylbenzene sulfonate (for example NEOGEN R™ or NEOGEN SC™) in an amount of from about 0.2 to about 2 percent by weight of the aggregate suspension to prevent further growth of the aggregates and heating the aggregate suspension at from about 5° C. to about 50° C. above the resin Tg to provide for particle fusion or coalescence of the polymer and pigment particles yielding a suspension of pigmented latex composite particles in which various particle size diameters can be obtained, such as from 0.1 to about 3, and preferably from about 0.2 to 1.5 microns in volume average particle diameter. The aforementioned particle dispersions are especially useful for ink jet printing of colored images with excellent line and solid resolution.

PRIOR ART

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of the '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70, are obtained. This process is thus directed to the use of coagulants, such as inorganic magnesium sulfate, which results in the formation of particles with a wide particle size distribution. Similarly, the aforementioned disadvantages, for example poor particle size distributions, are obtained hence classification is required resulting in low toner yields, are illustrated in other prior art, such as U.S. Pat. No. 4,797,339, wherein there is disclosed a process for the preparation of toners by resin emulsion polymerization, wherein similar to the '127 patent certain polar resins are selected; and U.S. Pat. No. 4,558,108, wherein there is disclosed a process for the preparation of a copolymer of styrene and butadiene by specific suspension polymerization. Other prior art that may be of interest includes U.S. Pat. Nos. 3,674,736; 4,137,188 and 5,066,560.

Emulsion/aggregation processes for the preparation of toners with optional charge control additives are illustrated in a number of Xerox Corporation patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,346,797, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797, the disclosures of which are totally incorporated herein by reference. Many of the components, such as colorants, latex, surfactants, toner additives, initiators, and the like of these patents, and know initiators, molecular weight control components, can be selected for the processes of the present invention in embodiments thereof. In these patents, there are illustrated various methods for the preparation of toner particles of size between about 3 and about 15 microns employing a latex-colorant, such as pigment aggregation process. In contrast, with the present invention there are illustrated processes wherein there can be selected similar latexes for the production of particulate ink jet inks utilizing a similar latex-pigment aggregation process, and wherein the adhesion of the particulate to the printing substrate, for example paper or a transparency, can be enhanced by the presence of a solid film forming polymer which aids in binding the pigment particles to the substrate surface and resists the tendency of pigment dispersions to smear on the substrate surface as they are often poorly adherent to such receivers in their untreated form.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug, or minimizing the small 40 to 80 microns size openings.

Therefore, an important requirement for ink jet ink is the ability of the ink to be stable with minimal or no settling, the ability of the inks to remain in a fluid condition in a printhead opening on exposure to air, and moreover, wherein when the inks are selected for ink jet printing there is minimized paper curl, or wherein paper curl can be controlled. A major concern with all ink jet printers is pluggage or clogging of nozzles during operations and between operations This can be by the evaporation of the organic solvent from the opening of the nozzles. In dye based inks, this is very common and often the intercolor bleeding is very noticeable. However, in the present invention these problems are avoided, or minimized since, for example, the ink is derived from (i) pigment particles instead of dye, and (ii) the medium is water based containing a surfactant(s).

Moreover, an important requirement for ink jet inks, especially for pigmented, such as carbon black, cyan, magenta and yellow based inks, is for the pigment dispersion to remain substantially stable throughout the life of the ink jet cartridge. Dye-based ink jet inks may possess deficiencies in waterfastness, smear resistance and lightfastness after being printed on various substrates. Pigments can provide an image on a wide variety of substrates with high optical density, excellent waterfastness, acceptable smear resistance and excellent lightfastness. Therefore, pigments are in many instances a preferred alternative to dyes, provided the pigment dispersions can be rendered stable to prevent flocculation and/or aggregation and settling. Additionally, there is a need for pigmented inks that provide high latency and also remain stable throughout the life of the ink jet cartridge. There is also a need for pigmented inks that provide high optical density in a single application or pass. More importantly, there is a need for ink jet inks wherein paper curl, and/or image smearing can be eliminated or minimized when such inks are selected for ink jet printing processes.

SUMMARY OF THE INVENTION

The present invention relates to an aqueous ink jet ink composition comprising water, colorant, especially pigmented particles, and which particles in embodiments possess a particle size distribution where at least about 70 percent of the particles have a diameter of from about 0.3 to about 2 microns, and wherein there are present certain surfactants and monomer that reduce or minimize paper curl. More specifically, the inks of the present invention are comprised of a major amount of water, colorant, especially pigment particles, resin, or polymer particles, such as styrene butylacrylate acrylic acid, in the composition ratio of 75:25:20 pph to about 82:18:2 pph. Also, the present invention relates to a high resolution printing process comprising applying the invention ink composition in imagewise fashion to a substrate. The ink possesses, for example, a latency of at least about 20 seconds in a printer having at least one nozzle of a channel width or diameter ranging from 10 to about 40 microns, and wherein paper curl is minimized or eliminated, and wherein the components of the ink contain resin particles in water containing anionic and nonionic surfactants.

Important embodiments of the present invention include an imaging process, which comprises the development of an image with an aqueous ink jet ink composition comprised of pigment, water, anionic, and nonionic surfactants, each present in an amount of from about 2 to about 10 weight percent, and which inks possess, for example, excellent smear resistance and high optical density.

In embodiments, the present invention relates to the provision of particulate printing inks and processes thereof. In embodiments of the present invention, there are provided processes for the economical direct preparation of particulate printing ink compositions by improved flocculation or heterocoagulation, and coalescence, and wherein the temperature of coalescence can be utilized to ensure that the colorant, preferably pigment, is in a stable dispersion, and that the ink can be effectively jetted and remains on the surface of the receiving substrate rather than being buried into the surface thereof. In embodiments, the present invention is directed to processes for the preparation of a latex comprised of resin, water, ionic and nonionic surfactants, and wherein the resin comprises from about 20 to about 60 percent of the weight of the latex dispersion and the surfactants comprise between about 1 percent to about 5 percent of the weight of the resin which process comprises utilizing during the latex synthesis oil soluble initiators, such as VAZO 64, 2-methyl, 2-2'-azobispropanenitrile, VAZO 88, 2-2'-azobis isobutyramide dihydrate, and the like, and water soluble initiators such as potassium, sodium or ammonium persulfate. These processes can be referred to as emulsion polymerization process and microsuspension process, and are primarily distinguished by the degree to which the oil or organic phase of the reactant monomers are dispersed in the aqueous reaction medium prior to accomplishing the polymerization of the monomers to form a suspension of latex particles in water. In the emulsion polymerization process, the oil (monomer) and water phases are simply mixed under mild conditions in the presence of a surfactant solution. Growth of the polymer is believed to be nucleated in the surfactant micelles that form in an aqueous solution of surfactants, and this controls the number of latex particles that are formed and thus influences the final size of the latex after the reaction is completed. Also, particle growth takes place as the reaction proceeds by monomers diffusing from large oil droplets, which are in the size range of from about 500 microns to about 2,000 microns into the micelles and reacting with the initiator and chain transfer reagents.

In microsuspension polymerization, the oil (monomer) phase is homogenized in the aqueous solution of a surfactant often using a cosolvent (a material soluble in the oil phase and being somewhat water soluble) thereby forming oil in water droplets of the final desired latex size before performing the polymerization, which is believed to simply polymerize the oil phase into a solid particle of the polymer dispersed in the aqueous medium.

Microsuspension process can provide a latex that has a particle size distribution that can be aggregated into particulate printing inks with suitable size particles in the range, for example, of from about 500 nanometers to about 2 microns with a narrow particle size distribution. It is important that the surfactant neutralization process employed to enable the aggregated toner particles utilizes a latex with a certain surface charge, which surface charge is usually characterized by the zeta potential of the latex conveniently measured using an optical microelectrophoresis apparatus at low particle concentration (approximately 10 parts of latex per million of pure deionized water). The surfactant aggregation process preferably selects a latex with a zeta potential of more than, or equal to about −80 mV, primarily since water soluble initiators are used in formulating the latex, and an oil soluble initiator alone may not provide this type of surface potential. Generally, providing anionically stabilized latexes with a zeta potential of below about −40 mV, the high zeta potential required of the latex requires the use of the water soluble initiators. More specifically, the preparation of the latex comprises the following. In the emulsion polymerization process, the monomers are added to an aqueous surfactant solution in the amount that renders the monomer about 30 percent by weight of the mixture, the remainder being surfactant (between about 1 and about 5 percent by weight) and water between about 65 and 69 percent by weight. To this mixture is added between about 1 and 4 percent by weight of a chain transfer agent, such as dodecanethiol, octanethiol or carbon tetrabromide, and between about 0.5 and about 3 percent by weight of a water soluble initiator and optionally between about 0.2 and about 1.5 percent of the oil soluble initiator. The mixture resulting is then heated to about 70° C. for between about 6 and about 8 hours while stirring continuously to complete the polymerization and form the latex suspension. The final $M_w$ and Tg of the latex is controlled by, for example, the composition of monomers used in the formulation and by the quantity of chain transfer agent that is added to the mixture. In the microsuspension process, the monomers are added to an aqueous surfactant solution in an amount that renders the monomer about 30 percent by weight of the mixture, the remainder being surfactant (between about 1 and about 5 percent by weight, and water between 65 and about 69 percent by weight. To this mixture is added between about 1 and about 4 percent by weight of a chain transfer agent (dodecanethiol, octanethiol or carbon tetrabromide), and between about 0.5 and about 3 percent by weight of a water soluble initiator and between about 0.2 an about 1.5 percent of the oil soluble initiator. The aqueous mixture is then subjected to high mechanical shear using a device, such as a polytron, forming oil droplets in the water phase that are between about 0.1 and about 0.5 micron in volume average diameter. The emulsion is then heated to about 70° C. while continuously stirring the emulsion to polymerize the monomers. As is the situation with the emulsion polymerization processes, a lower $M_w$ latex is formed when higher levels, or amounts of chain transfer agent are used and higher loading of the oil soluble initiator. The prepared latex can then be selected for the preparation of printing ink compositions as illustrated hereinafter. Thus, in embodiments, the present invention is directed to processes for the preparation of printing ink compositions which comprises initially attaining or generating an ionic pigment dispersion, for example, dispersing a pigment or mixture of pigments, such as carbon black, phthalocyanine or quinacridone, with a cationic surfactant, such as dodecyl ammonium chloride, by utilizing a high shearing device, such as a Brinkmann Polytron, thereafter shearing this mixture by utilizing a high shearing device, such as a Brinkmann Polytron, a sonicator or microfluidizer with a suspended latex resin mixture prepared as illustrated herein and comprised of polymer components, such as poly(styrene butadiene containing a carboxylic acid) or poly(styrene butylacrylate containing a carboxylic acid), poly (methyl methacrylate carboxylic acid), and the like, wherein the carboxylic acid can be an acrylic acid, methacrylic acid, itaconic acid and the like, and wherein the particle size of the suspended resin mixture is, for example, from about 0.01 to about 0.5 micron in an aqueous surfactant mixture containing an anionic surfactant, such as sodium dodecylbenzene sulfonate and nonionic surfactant; resulting in a flocculation, or heterocoagulation of the polymer or resin particles with the pigment particles caused by the neutralization of anionic surfactant absorbed on the resin particles with the oppositely charged cationic surfactant absorbed on the pigment particle; and further stirring the mixture using a mechanical stirrer at from about 250 to about 500 rpm while heating below about the resin Tg, for example from about 5° C. to about 15° C., and allowing the formation of electrostatically bound aggregates of a size of from about 0.1 micron to about 2 microns; followed by heating above about the resin Tg, for example from about 5° C. to about 50° C., to cause coalescence of the latex and pigment particles; whereby pigment latex particles comprised of resin and pigment with various particle size diameters can be obtained, such as from about 0.2 to about 1.5 microns in average volume particle diameter as measured by the Disk Centrifuge.

Embodiments of the present invention include a process for the preparation of ink jet particulate particles comprised of resin and pigment comprising (i) preparing, or providing a pigment dispersion in a water, which dispersion is comprised of a pigment, and a cationic surfactant;

(ii) shearing the pigment dispersion of (i) with a latex mixture prepared as illustrated herein, which latex is comprised of polymeric or resin particles with an $M_w$ of from about 15,000 to about 40,000, an $M_n$ of from about 2,000 to about 5,000, and a Tg of between about 30° C. and about 60° C. in water, anionic surfactant, and a nonionic surfactant;

(iii) heating the resulting homogenized mixture below about the resin Tg at a temperature of from about 25° C. to about 50° C. (or 5° C. to 20° C. below the resin Tg) thereby causing flocculation or heterocoagulation of the formed particles of pigment and resin to form electrostatically bounded aggregates of 0.8 to 2 micron sized particles;

(iv) adding anionic surfactant or stabilizing colloid in the range amount of from about 0.1 to about 10 weight percent to the aggregates comprised of resin and pigment particles to the electrostatically bounded toner sized aggregates prior to heating the aggregates of (iii) above the Tg of the resin, for example from about 50° C. to about 95° C. to form about 0.8 to about 2 micron sized particles comprised of polymeric resin and pigment; and (v) diluting this dispersion into water to obtain an appropriate ink formulation concentration and optionally adding viscosity modifiers.

Embodiments of the present invention also include a process for the preparation of ink jet particulate particles comprised of resin and pigment comprising (i) preparing a pigment dispersion in a water, which dispersion is comprised of a pigment and a cationic surfactant;

(ii) shearing the pigment dispersion with a latex mixture prepared as illustrated herein, which latex is comprised of polymeric or resin particles with an $M_w$ of from about 15,000 to about 40,000, an $M_n$ of from about 2,000 to about 5,000, and a Tg of between 30° C. and 60° C. (Centigrade) in water and anionic surfactant, and a nonionic surfactant;

(iii) heating the resulting homogenized mixture below about the resin Tg at a temperature of from about 25° C. to about 50° C. (or 5° C. to 20° C. below the resin Tg) thereby causing flocculation or heterocoagulation of the formed particles of pigment, resin to form electrostatically bounded aggregates of, for example from about 4 to about 8 microns in size;

(iv) adding excess of anionic surfactant or stabilizing colloid to the electrostatically bounded toner sized aggregates prior to heating the aggregates of (iii) above the Tg of the resin, for example, from about 50° C. to about 95° C., resulting in a breakdown of the aggregates to form 0.8 to 2 micron sized particles comprised of polymeric resin, pigment, and surfactant; and (v) diluting this dispersion into water to obtain the appropriate ink formulation concentration and optionally adding viscosity modifiers as required, for example, by the ink jet printing process.

Embodiments of the present invention also include a process of synthesizing a latex via a semibatch polymerization process comprising (i) dividing the oil phase into two portions; a reactor portion and a feed portion, where the portions are in the range of 20:80 to about 70:30, where the oil phase comprises monomers, chain transfer agent (CTA), and optionally an oil soluble initiator;

(ii) dividing the aqueous phase into two portions, wherein the aqueous phase comprises anionic and nonionic surfactants, wherein the total surfactant concentration is in the range of from about 0.5 to about 10 weight percent of the weight of the monomers and preferably in the range of from about 0.7 to about 5 weight percent;

(iii) adding one portion of the oil phase to one portion of the aqueous phase, thereafter emulsifying the mixture for a period of from about 5 to about 60 minutes and preferably for a period of from about 7 to about 30 minutes at a temperature of from about 20° C. to about 40° C., and preferably about 25° C. to about 35° C., and more preferably at room temperature, resulting in an emulsified mixture of oil and the aqueous phase;

(iv) preparing an aqueous solution of a water soluble initiator, such as potassium or ammonium persulfate, followed by separating the aqueous initiator into two portions, one associated with the reactor and the other associated with the feed; wherein the portions are in the range of about 20:80 to about 70:30; adding one portion of an aqueous soluble initiator to the reaction mixture; followed by further emulsification of the reaction mixture for a period of from about 5 to about 60 minutes and preferably for a period of from about 7 to about 30 minutes at a temperature of from about 20° C. to about 40° C., and more preferably at room temperature;

(v) heating the resulting mixture (iv) to a temperature of from about 60° C. to about 80° C.;

(vi) feeding a preemulsified mixture of the remaining portions of the oil phase (3ci) and (3cii) to the reactor contents of (v), wherein the feeding of the oil/aqueous and the initiator phases is achieved over a period of about 30 minutes to 4 hours; and (vii) upon completion of the feeding (vi) the reaction is further heated for a period of about 4 to about 6 hours to complete the polymerization.

Embodiments of the present invention include a process for the preparation of a latex of polymer and water by semibatch emulsion polymerization process, which process comprises (1) polymerizing an organic phase of monomers in the presence of a carboxylic acid, an oil soluble chain transfer agent and a partially water soluble chain transfer agent, and in the presence of (2) an aqueous phase containing a nonionic surfactant and an anionic surfactant, and wherein there is added to the aqueous phase an aqueous initiator solution of, for example, an inorganic persulfate, and wherein the resulting latex contains particles of polymer with carboxylic acid covalently bonded to the polymer, and which particles are in the size range of from about 0.03 to about 0.3 micron in volume average diameter, and of a molecular weight, $M_w$, of from about 8,000 to about 80,000, with a polymer Tg of from about 20° C. to about 70° C.; thereafter aggregating said resulting latex with colorant particles by heating at a temperature of from about 5° C. to about 15° C. about equal to, or about below the Tg of the latex polymer resulting in toner size aggregates of polymer and colorant particles, which particles are in the size range of from about 1.0 to about 5 microns in volume average diameter; thereafter adding an effective amount of anionic surfactant in the range amount of from about 0.01 to about 10 weight percent based on the amount of solids, and subsequently heating the resulting mixture at about equal to, or about above the polymer Tg enabling a breakdown of the aggregates into colorant particles in the size range of from about 0.3 to about 2 microns in volume average diameter; a process wherein said organic phase is comprised of monomers of styrene/acrylates, said colorant is a pigment, and wherein said aqueous initiator solution of inorganic persulfate is added for the primary purpose of initiating polymerization, wherein the resulting latex contains styrene/acrylic and carboxylic acid, and the particles are in the size range of from about 0.08 to about 0.2 micron with a polymer $M_w$ molecular weight of from about 12,000 to about 60,000, with a polymer Tg of from about 30° C. to about 60° C.; and wherein said latex possesses colloidal properties and said breakdown of the aggregates is into pigmented particles in the size range of about 0.3 to about 1.5 microns; a process wherein said monomers are styrene/butylacrylate containing carboxylic acids of acrylic acid in said nonionic/anionic surfactant solution, and wherein said submicron colorant particles are pigmented particles comprised of styrene/acrylate/carboxylic acid and pigment suspended in water containing anionic/nonionic surfactant; a process resulting in submicron pigmented particles with excellent surface colloidal characteristics suitable for ink jet applications; a process wherein the carboxylic acid amount is from about 3 to about 20 parts per hundred (pph) of the monomers; or wherein said carboxylic acid amount is from about 5 to about 20 parts (pph) of the monomers; a process wherein the ink particles are comprised of polymer and colorant, with polymer being present in an amount of from about 90 to about 97 weight percent by weight of solids, and with colorant being present in amount from about 10 to about 3 weight percent by weight of solids, and wherein the colorant is a pigment; a process wherein the semibatch polymerization process comprises (i) separating the oil phase comprising monomers of styrene/butylacrylate, chain transfer agents, and oil initiators;

(ii) dividing into two portions, into reactor portion and a feed portion of the aqueous phase, wherein the aqueous phase comprises anionic and nonionic surfactants, wherein the total surfactant concentration is in the range of from about 0.5 to about 10 weight percent of the weight of the monomers and preferably in the range of about 0.7 to about 5 weight percent;

(iii) adding one portion of the oil phase, which can be selected in the range amount of about 60 to about 80 weight percent of the total oil phase, to one portion of the aqueous phase, which can be selected in the range amount of about 40 to about 80 weight percent of the weight of the aqueous phase, thereafter emulsifying the mixture for a period of from about 5 to about 60 and preferably for a period of 7 to 30 minutes at a temperature of from about 20° C. to 40° C., and preferably at from about 25° C. to about 35° C., resulting in an emulsified mixture of an oil and an aqueous phase;

(iv) adding a portion of the aqueous soluble initiator of potassium or ammonium persulfate to the reaction mixture; followed by further emulsification of the reaction mixture for a period of 5 to 60 minutes and preferably for a period of 7 to 30 minutes at a temperature of 20° C. to 40° C., and preferably for a period of 25° C. to 35° C., and more preferably at room temperature;

(v) heating the resulting mixture (iv) to a temperature of about 60° C. to 80° C.;

(vi) feeding a pre-emulsified mixture of the remaining portions of the oil phase to the reactor contents of (v), where the feeding of the oil/aqueous and the initiator phase is achieved over a period of about 30 minutes to 4 hours; and (vii) further heating at a temperature of 60° C. to 80° C. for a period of about 4 to about 6 hours, complete the polymerization; and cooling; a process wherein the reactor to feed ratio is from about 20 to about 60 percent of the total weight of the formulation of the monomer and the aqueous phases; a process wherein the polymer is a styrene acrylate, styrene isoprene or a styrene methacrylate; a process wherein the polymer is a styrene butylacrylate acrylic acid terpolymer; a process wherein acrylic acid is in the range of about 50 to 90 weight percent based on the monomer weight; a processwherein the ratio of the partially soluble chain transfer agent of carbon tetrabromide to the carboxylic acid acrylic acid is in the range amount of from about 0.1 to about 2.0; a process wherein the nonionic surfactant is an alkyl-polyethylene oxide with an alkyl chain of length between 10 and 16 carbon atoms, and the polyethylene oxide has from about 20 to about 60 ethylene oxide segments; a process wherein the anionic surfactant is a sodium salt of an alkyl sulfonic acid or alkyl benzyl sulfonic acid, and wherein the alkyl chain contains from about 10 to about 18 carbons; a process wherein the anionic surfactant is linear or branched type; a process wherein said polymer has a weight average molecular weight of from about 15,000 to about 40,000, and a number average molecular weight of from about 3,000 to about 5,000; a process wherein the oil soluble initiator is VAZO 88 (2-2'-azobis isobutyramide dihydrate); a process wherein the oil soluble initiator is VAZO 64, (2-methyl, 2-2'-azobis propanenitrile); a process wherein the water soluble initiator is the inorganic persulfate of ammonium persulfate, sodium persulfate or potassium persulfate, and is selected in an amount of between about 0.2 to about 2 weight percent of the monomers; a process for the preparation of a pigmented latex dispersion which comprises (i) preparing a pigment dispersion, which dispersion is comprised of a pigment and a cationic surfactant;

(ii) shearing said pigment dispersion with a latex or emulsion blend comprised of resin, an anionic surfactant, and a nonionic surfactant;

(iii) heating the above sheared blend below about the glass transition temperature (Tg) of the latex polymer to form electrostatically bound micron size aggregates; and adding a solution of stabilizing surfactant or colloidal stabilizer to the aggregate suspension; and (iv) heating said bound aggregates above about the Tg of the polymer to coalesce the electrostatically bound aggregates into solid particles; a process for the preparation of a pigmented latex dispersion which comprises (i) preparing a pigment dispersion, which dispersion is comprised of a pigment and a cationic surfactant;

(ii) shearing said pigment dispersion with the latex or emulsion blend obtained by the process of claim 1, and comprised of resin, an anionic surfactant, and a nonionic surfactant;

(iii) heating the above sheared blend below about the glass transition temperature (Tg) of the resin to form electrostatically bound micron size aggregates with a narrow particle size distribution; and adding an excess of a solution of stabilizing surfactant or colloidal stabilizer to the aggregate suspension; and (iv) heating said bound aggregates above about the Tg of the resin resulting in a breakdown of aggregate particles into submicron pigmented particles upon coalescence; a process wherein the temperature below the resin Tg of (iii) controls the size of the aggregated particles in the range of from about 0.5 to about 2 microns in average volume diameter; a process wherein the size of said aggregates can be increased to from about 0.5 to about 2 microns by increasing the temperature of heating in (iii) to from about room temperature to about 50° C., wherein the particle size distribution of the aggregated particles is narrower, about 1.40 decreasing to about 1.16, when the temperature is 10° C. greater than the Tg of the latex, wherein the surfactant utilized in preparing the pigment dispersion is a cationic surfactant, and the counterionic surfactant present in the latex mixture is an anionic surfactant; or wherein the surfactant utilized in preparing the pigment dispersion is an anionic surfactant, and the counterionic surfactant present in the latex mixture is a cationic surfactant; a process wherein the polymer resulting from polymerization of the monomer selected is selected from the group consisting of poly(styrene-butadiene), poly(para-methyl styrene-butadiene), poly(meta-methylstyrene-butadiene), poly(alpha-methylstyrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(meta-methylstyrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene); wherein the nonionic surfactant is selected from the group consisting of polyvinyl alcohol, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, and dialkylphenoxy poly(ethyleneoxy)ethanol; wherein the anionic surfactant is selected from the group consisting of sodium dodecyl sulfate, sodium dodecylbenzene sulfate, and sodium dodecylnaphthalene sulfate; wherein the pigment is carbon black, cyan, yellow, magenta, and mixtures thereof; a process wherein the nonionic surfactant concentration is from about 0.1 to about 5 weight percent; the anionic surfactant concentration is about 0.1 to about 5 weight percent; and the cationic surfactant concentration is about 0.1 to about 5 weight percent of the toner components of resin, colorant and charge control agent; a process wherein said carboxylic acid is covalently bonded to said polymer; and a process comprising (1) polymerizing an organic phase of monomers in the presence of a carboxylic acid, an oil soluble chain transfer agent, and a partially water soluble chain transfer agent; and which polymerizing is accomplished in the presence of (2) an aqueous phase containing a nonionic surfactant, and an anionic surfactant, and wherein there is added to the aqueous phase an aqueous initiator solution of an inorganic persulfate, and wherein the resulting latex contains particles of polymer with carboxylic acid, aggregating said latex particles with colorant; thereafter adding an effective amount of anionic surfactant and heating the mixture resulting about equal to, or about above the polymer resulting from said monomer, or said monomers, Tg.

Illustrative examples of specific resins, resin particles, or polymers, include known polymers such as poly(styrene-butadiene), poly(para-methyl styrene-butadiene), poly(meta-methyl styrene-butadiene), poly(alpha-methyl styrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(meta-methyl styrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene); polymers such as poly(styrene-butadieneacrylic acid), poly(styrene-butadiene-methacrylic acid), polyethylene-terephthalate, polypropylene-terephthalate, polybutylene-terephthalate, polypentylene-terephthalate, polyhexylene-terephthatate, polyheptydene-terephthalate, polyoctylene-terephthalate, and the like. The resin selected, which generally can be in embodiments styrene acrylates, styrene butadienes, styrene methacrylates, or polyesters, are present in various effective suitable amounts, such as from about 85 weight percent to about 98 weight percent of the toner, and can be of small average particle size, such as from about 0.01 micron to about 0.5 micron in average volume diameter as measured by the Brookhaven Disk Centrifuge particle size analyzer. Other particles, sizes and effective amounts of resin particles may be selected in embodiments, for example, copolymers of poly(styrene butylacrylate acrylic acid) or poly(styrene butadiene acrylic acid). The amount of acrylic or methacrylate acid is generally in the range of 2 to 20 weight percent of the monomers and preferably in the range of 3 to 15 weight percent.

Examples of anionic surfactants selected for the emulsion polymerization and for preparation of the latex resin for the ink compositions of the present invention include, for example, sodium dodecyl sulfate, sodium dodecylbenzene sulfonate, sodium dodecylnaphthalene sulfate, dialkyl benzenealkyl, sulfates and sulfonates, abetic acid, available from Aldrich, NEOGEN R™, NEOGEN SC™ obtained from Kao, and the like. One effective concentration of the anionic surfactant is, for example, from about 0.01 to about 10 percent by weight, and preferably from about 0.1 to about 5 percent by weight of the latex resin.

Illustrative examples of nonionic surfactants selected in amounts of, for example, from about 0.01 to about 10 percent by weight, and preferably from about 0.1 to about 5 percent by weight of latex resin in embodiments, include dialkylphenoxypoly(ethyleneoxy) ethanol available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™.

Examples of cationic surfactants utilized in the pigment dispersion for the toners and processes of the present invention include, for example, dialkyl benzenealkyl ammonium chloride, lauryl trimethyl ammonium chloride, alkyl benzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride) available from Kao Chemicals, and the like, and mixtures thereof. This surfactant is utilized in various effective amounts, such as for example from about 0.01 to about 10 percent by weight of latex resin.

Examples of the additional surfactants, which are added prior to coalescence to prevent further growth in aggregate size with temperature include anionic surfactants, such as sodium dodecylbenzene sulfonates, sodium dodecylnaphthalene sulfate, dialkyl benzenealkyl, sulfates and sulfonates, abitic acid available from Aldrich, NEOGEN R™, NEOGEN SC™ obtained from Kao, and the like; and nonionic surfactants, such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. One effective concentration of this added surfactant that primarily functions to stabilize the aggregate size during coalescence ranges, for example, from about 0.01 to about 10 percent by weight, and preferably from about 0.05 to about 5 percent by weight of the total weight of reaction mixture solids.

Examples of water soluble initiators are potassium persulfate, ammonium persulfates, and the like, and which initiators can be selected in various amounts, for example from about 0.5 to about 3 weight percent of monomer and preferably from about 0.6 to about 2 weight percent. Oil soluble initiators can also be selected, either in place of the water soluble initiator, or in combination with the water soluble initiators, and such oil soluble initiators are generally selected in an amount of from about 0.5 to 5 percent and preferably in the range of from about 1.0 about 4 percent by weight.

Examples of water soluble, partially water soluble chain transfer agents are carbon tetrabromide, octanethiol, butanethiol, mercapto acetic acid, and the like, and which agents are selected in various amounts of, for example, from about 0.5 to about 5 weight percent and preferably from about 1 to about 4 weight percent, or parts.

Colorant includes pigment, dye, mixtures thereof, mixtures of pigments, mixtures of dyes, and the like. Generally the colorant is present is suitable amounts, for example from about 1 to about 20 weight percent, and preferably from about 3 to about 12 weight percent. Colorant includes known components, such as pigments like carbon black, and the like, reference for example U.S. Pat. Nos. 5,290,654; 5,278,020; 5,370,963; 5,418,108, and the like.

Other ink components and ink additives, such as biocides, humectants, and the like, are known, and can be selected for the inks of the present invention in various suitable amounts, such as from about 0.05 to about 5, and preferably from about 1 to about 2 weight percent.

The following Examples are being submitted to further define various species of the present invention. These Examples are intended to be illustrative only and are not intended to limit the scope of the present invention. Also, parts and percentages are by weight unless otherwise indicated. Nanometers can be converted to microns by dividing the nanometer size provided by 1,000.

EXAMPLE I

Latex Preparation: Control

A polymeric latex was prepared by the emulsion polymerization of styrene/butylacrylate/acrylic acid, 82/18/2 parts (by weight), in a nonionic/anionic surfactant solution (3 percent) as follows. 328 Grams of styrene, 72 grams of butylacrylate, 8 grams of acrylic acid, 12 grams (3 percent) of dodecanethiol and 4 grams of carbon tetrabromide (1 percent) were mixed with 500 milliliters of deionized water in which 9.0 grams of sodium dodecyl benzene sulfonate anionic surfactant (NEOGEN R™ which contains 60 percent of active component), 8.6 grams of polyoxyethylene nonyl phenyl ether, nonionic surfactant (ANTAROX 897™, 70 percent active) were present. Four (4) grams of ammonium persulfate initiator were dissolved in 100 grams of water and added to the above, and mixed for a period of 10 minutes. The emulsion was then polymerized at 70° C. for 6 hours. The resulting latex contained 60 percent of water and 40 percent of solids of the styrene butylacrylate copolymer 82/18/2 pph; the Tg of the latex dry sample was 54.5° C., as measured on DuPont DSC; latex resin, or polymer $M_w$=18,500, and $M_n$=5,200 as determined on Waters GPC. The zeta potential as measured on Pen Kem Inc. Laser Zee Meter was a negative −95 millivolts. The particle size of the latex as measured on Brookhaven BI-90 Particle Nanosizer was 150 nanometers. The aforementioned latex was then selected for the ink preparation as indicated herein.

Preparation of Cyan Ink Particles 7.5 Grams of BHD 6000 (53 percent solids) SUNSPERSE BLUE™ pigment was dispersed in 240 milliliters of deionized water containing 3.2 grams of alkylbenzylmethyl ammonium chloride cationic surfactant (SANIZOL B™) by stirring. This cationic dispersion of the pigment was then simultaneously added to 260 grams of the above prepared latex (40 percent solids) in 400 grams of water while being homogenized with an IKA G45M probe for 3 minutes at 5,000 rpm. This mixture then was transferred to a reaction kettle and its temperature raised to 45° C., and the mixture was retained at this temperature for a period of 2 hours. The aggregates resulting comprised 3.5 weight percent of the pigment and 96.5 weight percent of the resin, or polymer, by weight of toner, in an aqueous solution containing anionic and nonionic surfactant were 4.2 microns in volume average diameter as determined by a Coluter Counter with a GSD of 1.20 as measured on a Coulter Counter. 90 Millimeters of 20 percent (W/W) NEOGEN R™ anionic surfactant solution were added to the aggregates and the reactor temperature was raised to 93.0° C. (4 hours) to complete the coalescence of the aggregates. The particles, which breakdown into pigmented small sized entities, were found to be 650 nanometers in size as measured on the Disk Centrifuge. These submicron pigmented particles were comprised of 96.5 weight percent resin and 3.5 weight percent pigment, wherein the resin comprised styrene, butylacrylate and acrylic acid in the ratio of 82:18:2 pph of the comonomers, suspended in an aqueous medium containing anionic and nonionic surfactant. After cooling these particles in their aqueous environment (no separation of particles from the suspension), they were evaluated for jetting capacity in an ink jet printer, and there was indicated partial jetting capability and some of the ink jet nozzles were clogged.

EXAMPLE II

Latex Preparation (Surfactant Type)

A polymeric latex was prepared by emulsion polymerization of styrene/butylacrylate/acrylic acid, 82/18/2 parts (by weight), in a nonionic/anionic surfactant solution (3 percent) as follows. 328 Grams of styrene, 72 grams of butylacrylate, 8 grams of acrylic acid, 12 grams (3 percent) of dodecanethiol, and 4 grams of carbon tetrabromide (1 percent) were mixed with 500 milliliters of deionized water in which 6 grams of sodium dodecyl benzene sulfonate anionic surfactant (DS-10™ which contains 100 percent of active component), 8.6 grams of polyoxyethylene nonyl phenyl ether, nonionic surfactant (ANTAROX 897™, 70 percent active). Four grams of ammonium persulfate initiator were dissolved in 100 grams of water and added to the above latex, followed by mixing for a period of 10 minutes. The resulting emulsion was then polymerized at 70° C. for 6 hours. The resulting latex contained 60 percent of water and 40 percent of solids of the styrene butylacrylate copolymer 82/18/2 pph; the Tg of the latex dry sample was 54.5° C., as measured on DuPont DSC; $M_w$=18,000, and $M_n$=5,000 as determined on Hewlett Packard GPC. The zeta potential as measured on Pen Kem Inc. Laser Zee Meter was −90 millivolts. The particle size of the latex as measured on Brookhaven BI-90 Particle Nanosizer was 165 nanometers. The aforementioned latex was then selected for the ink preparation as indicated herein.

Preparation of Cyan Ink Particles 7.5 Grams of BHD 6000 (53 percent solids) SUNSPERSE BLUE™ pigment were dispersed in 240 milliliters of deionized water containing 3.2 grams of alkylbenzylmethyl ammonium chloride cationic surfactant (SANIZOL B™) by stirring. This cationic dispersion of the pigment was then simultaneously added to 260 grams of the above prepared 165 nanometer latex (40 percent solids) in 400 grams of water while being homogenized with an IKA G45M probe for 3 minutes at 5,000 rpm. This mixture then was transferred to a reaction kettle and its temperature raised to 45° C. for a period of 2 hours (hours). The aggregates were comprised of 3.5 weight percent of the pigment and 96.5 weight percent of the resin by weight in an aqueous solution containing anionic and nonionic surfactant, and the aggregate was found to be 4.5 microns with a GSD of 1.20 as measured on a Coulter Counter. About, 70 milliliters of 20 percent (W/W) DS-10™ anionic surfactant solution was added to the aggregates and the reactor temperature was raised to 93.0° C., and retained at this temperature for 4 hours to complete the coalescence of the aggregates. The particles were found to breakdown into pigmented small sized entities, and were found to be 700 nanometers in size as measured on the Disk Centrifuge. These pigmented particles were comprised of 96.5 weight percent resin and 3.5 weight percent pigment, wherein the resin comprises styrene, butylacrylate and acrylic acid in the ratio of 82:18:2 pph of the comonomers. After cooling to room temperature, about 25° C., these particles were evaluated for jetting capacity in an ink jet printer with the results indicated hereinafter.

EXAMPLE III

Preparation of Latex (Acrylic Acid: $CBr_4$ Ratio)— Via A Semibatch Process

A polymeric latex was prepared by semibatch emulsion polymerization of styrene/butylacrylate/acrylic acid, 82/18/2 parts (by weight), in nonionic/anionic surfactant solution (3 percent) as follows. 164 Grams of styrene, 36 grams of butylacrylate, 24 grams of acrylic acid, and 8 grams (2 percent) of dodecanethiol and 4 grams (1 percent) of carbon tetrabromide were mixed with 250 milliliters of deionized water in which 5 grams of sodium dodecyl benzene sulfonate anionic surfactant (NEOGEN R™ which contains 60 percent of active component), 4.3 grams of polyoxyethylene nonyl phenyl ether, nonionic surfactant (ANTAROX 897™, 70 percent active). Two grams of ammonium persulfate initiator dissolved in 50 grams of water were added to the above mixture and mixed for a period of 10 minutes. The emulsion was then heated up to 70° C. when a feed containing 164 grams of styrene, 36 grams of butylacrylate, and 4 grams (1 percent) of dodecanethiol, mixed in 250 milliliters of deionized water containing 5 grams of sodium dodecyl benzene sulfonate anionic surfactant (NEOGEN R™ which contains 60 percent of active component), 4.3 grams of polyoxyethylene nonyl phenyl ether, nonionic surfactant (ANTAROX 897™, 70 percent active), and 2 grams of ammonium persulfate were provided into the reactor over a period of 2 hours. The reactor contents were then polymerized for 6 hours. The resulting latex contained 60 percent of water and 40 percent of solids of the styrene butylacrylate copolymer 82/18/2 pph; the Tg of the latex dry sample was 55.8° C., as measured on DuPont DSC; $M_w$=21,000, and $M_n$=4,600 as determined on Hewlett Packard GPC. The zeta potential as measured on Pen Kem Inc. Laser Zee Meter was −90 millivolts. The particle size of the latex as measured on Brookhaven BI-90 particle nanosizer was 165 nanometers. The aforementioned latex was then selected for the ink preparation as indicated herein.

Preparation of Cyan Ink Particles 7.6 Grams of BHD 6000 (53 percent solids) SUNSPERSE BLUE™ pigment were dispersed in 240 milliliters of deionized water containing 3.0 grams of alkylbenzyldimethyl ammonium chloride cationic surfactant (SANIZOL B™) by stirring. This cationic dispersion of the pigment was then simultaneously added to 260 grams of the above prepared latex (40 percent solids) in 400 grams of water while being homogenized with an IKA G45M probe for 3 minutes at 5,000 rpm. This mixture then was transferred into a reaction kettle and its temperature raised to 45° C. for a period of 1 hour. The aggregates were comprised of 3.5 weight percent of the pigment and 96.5 weight percent of the resin by weight of solids in an aqueous solution containing anionic and nonionic surfactant and these aggregates were each about 4.1 microns in volume average diameter, with a GSD of 1.24 as measured by the Coulter Counter. 35 Milliliters of 20 percent (W/W) NEOGEN R™ anionic surfactant solution were added to the aggregates. Within 15 minutes at 93° C., the aggregates began falling apart and in 4 hours were found to breakdown to 600 nanometers in size as measured on the Disk Centrifuge. These small pigmented particles were comprised of 96.5 weight percent resin and 3.5 weight percent pigment, wherein the resin comprises styrene, butylacrylate and acrylic acid in the ratio of 82:18:2 pph. These particles were cooled and tested in an ink jet printer, evidencing excellent jettability without plugging the ink nozzles.

EXAMPLE IV
Preparation of Latex Via a Semibatch Process: (Acrylic Acid: CBr$_4$ Ratio [3:1] and Surfactant Type [e.g., SDBS - DS-10™])

A polymeric latex was prepared by semibatch emulsion polymerization of styrene/butylacrylate/acrylic acid, 82/18/6 parts (by weight), in a nonionic/anionic surfactant solution (3 percent) as follows. 164 Grams of styrene, 36 grams of butylacrylate, 24 grams of acrylic acid, 8 grams (2 percent) of dodecanethiol, and 8 grams (2 percent) of carbon tetrabromide were mixed with 250 milliliters of deionized water in which there were contained grams of sodium dodecyl benzene sulfonate anionic surfactant (DS-10™ which contains 100 percent of active component), 4.3 grams of polyoxyethylene nonyl phenyl ether, nonionic surfactant (ANTAROX 897™, 70 percent active). Two grams of ammonium persulfate initiator were dissolved in 50 grams of water, were added to the above, and mixed for a period of 10 minutes.

The emulsion was then heated up to 70° C. when a feed was added thereto containing 164 grams of styrene, 36 grams of butylacrylate, and 4 grams (1 percent) of dodecanethiol, mixed in 250 milliliters of deionized water containing 3 grams of sodium dodecyl benzene sulfonate anionic surfactant (DS-10™ which contains 100 percent of active component), 4.3 grams of polyoxyethylene nonyl phenyl ether, nonionic surfactant (ANTAROX 897™, 70 percent active), and 2 grams of ammonium persulfate were provided into the reactor over a period of 1.5 hours. The reactor contents were then polymerized for 6 hours. The resulting latex contained 60 percent of water and 40 percent of solids of the styrene butylacrylate copolymer 82/18/2 pph; the Tg of the latex dry sample was 54.8° C., as measured on DuPont DSC; $M_w$=22,000, and $M_n$=4,900 as determined on Hewlett Packard GPC. The zeta potential as measured on Pen Kem Inc. Laser Zee Meter was −95 millivolts. The particle size of the latex as measured on Brookhaven BI-90 particle nanosizer was 165 nanometers. The aforementioned latex, which was comprised of submicron, about 0.5, resin particles comprised of styrene butylacrylate and acrylic acid in the ratio of 82:18:6 pph, was then selected for the ink preparations as indicated herein.

Preparation of Cyan Ink Particles 7.6 Grams of BHD 6000 (53 percent solids) SUNSPERSE BLUE™ pigment were dispersed in 240 milliliters of deionized water containing 3.0 grams of alkylbenzyldimethyl ammonium chloride cationic surfactant (SANIZOL B™) by stirring. This cationic dispersion of the pigment was then simultaneously added with 260 grams of the above prepared latex (40 percent solids) to 400 grams of water while being homogenized with an IKA G45M probe for 3 minutes at 5,000 rpm. This mixture then was transferred into a reaction kettle and its temperature raised to 45° C. for a period of 90 minutes. The aggregate comprised of 3.5 weight percent of the pigment and 96.5 weight percent of the resin by weight of toner in an aqueous solution containing anionic and nonionic surfactant, and was found to have a particle size of 4.1 microns with a GSD of 1.19 as measured by the Coulter Counter. 90 Milliliters of 12 percent (W/W) DS-10™ anionic surfactant solution was added to the aggregates, after which the reactor temperature was raised to 93.0° C. and held there for 4 hours to complete the coalescence of the aggregates. At the end of 4 hours, the aggregates breakdown or separate to 670 nanometers in size as measured on the Disk Centrifuge. These small particles, which were comprised of 96.5 weight percent resin and 3.5 weight percent pigment, wherein the resin comprises styrene, butylacrylate and acrylic acid in the ratio of 82:18:6 pph of the comonomers, were evaluated for jettability, which was found to be excellent, and wherein no ink jet nozzle clogging resulted.

Preparation of Yellow Ink Particles

30 Grams of YHD 6001 (45.7 percent solids) SUNSPERSE YELLOW™ pigment were dispersed in 240 milliliters of deionized water containing 2.8 grams of alkylbenzyldimethyl ammonium chloride cationic surfactant (SANIZOL B™) by stirring. This cationic dispersion of the pigment was then simultaneously added with 260 grams of the above prepared latex (40 percent solids) to 400 grams of water while being homogenized with an IKA G45M probe for 3 minutes at 5,000 rpm. The resulting mixture was then transferred into a reaction kettle and its temperature raised to 45° C. for a period of 90 minutes. The resulting aggregates comprised of 8.0 weight percent of the pigment and 92.0 weight percent of the resin by weight, and in an aqueous solution containing anionic and nonionic surfactant was found to be 4.6 microns with a GSD of 1.20 as measured by the Coulter Counter. 100 Milliliters of 12 percent (W/W) DS-10™ anionic surfactant solution were added to the aggregates, after which the reactor temperature was raised to 93.0° C. and held there for 4 hours to complete the coalescence of the aggregates. At the end of 4 hours, the aggregates breakdown to 750 nanometers in size as measured on the Disk Centrifuge. The pigmented particles were comprised of 92.0 weight percent resin and 8.0 weight percent pigment, wherein the resin comprises styrene, butylacrylate and acrylic acid in the ratio of 82:18:6 pph of the comonomers, and when tested for jettability these particles evidenced excellent, that is no imaging smear, the images were 99 percent waterfast and no image intercolor bleeding resulted.

Preparation of Magenta Ink Particles

22 Grams of QHD 6040 (40 percent solids) SUNSPERSE MAGENTA™ pigment were dispersed in 240 milliliters of deionized water containing 2.8 grams of alkylbenzyldimethyl ammonium chloride cationic surfactant (SANIZOL B™) by stirring. This cationic dispersion of the pigment was then simultaneously added with 260 grams of the above latex (40 percent solids) to 400 grams of water while being homogenized with an IKA G45M probe for 3 minutes at 5,000 rpm. This mixture was then transferred into a reaction kettle and its temperature raised to 45° C. for a period of 90 minutes. The aggregate comprised of 6.0 weight percent of the pigment and 94.0 weight percent of the resin by weight of toner in an aqueous solution containing anionic and nonionic surfactant, and was found to have 4.5 microns with a GSD of 1.21 as measured by the Coulter Counter. 100 Milliliters of 12 percent (W/W) DS-10™ anionic surfactant solution were added to the aggregates, after which the reactor temperature was raised to 93.0° C. and held there for 4 hours to complete the coalescence of the aggregates. At the end of 4 hours the aggregates were found to breakdown to 750 nanometers in size as measured on the Disk Centrifuge. The particles, which were comprised of 92.0 weight percent resin and 8.0 weight percent pigment, wherein the resin comprises styrene, butylacrylate and acrylic acid in the ratio of 82:18:6 pph of the comonomers, were tested for jettability and showed excellent results as an ink similar to the results of the cyan ink above.

The excellent three color prints formulated with these inks utilizing two different latexes indicated the jettability of the submicron particles with different pigments. The prints obtained on an HP printer showed excellent jettability, and no ink orifice plugging.

EXAMPLE V

Latex Preparation by Using Oil/Water Soluble Initiator

A latex was prepared utilizing the emulsion polymerization process with the monomers styrene and butylacrylate in the ratio of 75:25 with the addition of 2 parts per hundred of acrylic acid and chain transfer agent at 4 percent loading (dodecanethiol) in a mixed surfactant solution of nonionic and anionic surfactants (3 percent loading) as follows. 246 Grams of styrene, 54 grams of butylacrylate, 6 grams of acrylic acid, and 12 grams of dodecanethiol were mixed with 600 grams of deionized water in which 4.5 grams of sodium dodecyl benzene sulfonate anionic surfactant (NEOGEN R™, which contains 60 percent of the active component), 4.5 grams of the nonionic surfactant polyoxyethylene nonyl phenyl ether (ANTAROX 897™, which contains 70 percent of the active surfactant), 100 grams of water containing 3 grams of ammonium persulfate initiator were then added to the above mixture. The emulsion was then polymerized at 70° C. for 8 hours. The resulting latex, 70 percent water and 30 percent (weight percent throughout) solids, was comprised of a terpolymer of styrene, butylacrylate and polyacrylic acid; the Tg of the latex dry sample was 40° C., as measured on a DuPont DSC; the latex resin had an $M_w$=20,100, and $M_n$=3,980 as determined on a Water's GPC. The volume average particle size of latex as measured on a Brookhaven Disk Centrifuge was 175 nanometers and the zeta potential of the latex was measure to be −90 millivolts as measured using the Pen Kem Lazer Zee meter.

Pigmented Latex Particle Preparation Using Latex V (Cyan Particles)

6.8 Grams of the dispersed cyan pigment BHD6000 (from Sun Chemicals) SUNSPERSE BLUE™ pigment (53 percent Solids) was dispersed in 240 grams of deionized water containing 1.5 grams of alkylbenzyldimethyl ammonium chloride cationic surfactant (SANIZOL B™) by stirring. This cationic dispersion of the cyan pigment was than simultaneously added along with 346 grams of Latex B (30 percent solids) to 400 grams of water while being homogenized with an IKA G45M probe for 3 minutes at 5,000 rpm. This mixture then was transferred to a reaction kettle and its temperature raised to 30° C. for a period of 90 minutes. The volume average particle size of the aggregate obtained was 0.95 micron as measured using a Disk Centrifuge. 60 Milliliters of an aqueous 20 percent (w/w) anionic surfactant solution were added to the aggregates, after which the reactor temperature was raised to 80° C. for 4 hours to complete the coalescence of the aggregates into particles. The particle size measurement showed no volume average diameter increase.

Ink Jet Printing Tests On Pigmented Latex Dispersion Preparation Using Latex V

In Example II the dispersion that results from the pigmented latex particle preparation was used in an ink jet printing fixture after diluting to a solids concentration of 5 percent w/w with deionized water. The cyan prints generated were found to have very similar print quality to those provided in Example I with excellent line resolution and low color "bleed" on paper. With the lower Tg base latex, the smear resistance of the prints was excellent, that is hand rubbing on a freshly jetted image showed excellent fix on the paper without any smear, requiring no additional heat to the print to improve the smear resistance.

Other embodiments and modifications of the present invention may occur to those skilled in the art subsequent to a review of the information presented herein; these embodiments, modifications, and equivalents thereof, are also included within the scope of this invention.

What is claimed is:

1. A process for the preparation of inks comprising the preparation of a latex of polymer and water by semibatch emulsion polymerization process, which process comprises (1) polymerizing an organic phase of monomers in the presence of a carboxylic acid, an oil soluble chain transfer agent and a partially water soluble chain transfer agent, and in the presence of (2) an aqueous phase containing a nonionic surfactant and an anionic surfactant, and wherein there is added to the aqueous phase an aqueous initiator solution of an inorganic persulfate, and wherein the resulting latex contains particles of polymer with carboxylic acid covalently bonded to the polymer, and which particles are in the size range of from about 0.03 to about 0.3 micron in volume average diameter, and of a molecular weight, $M_w$, of from about 8,000 to about 80,000, with a polymer Tg of from about 20° C. to about 70° C.; thereafter aggregating said resulting latex with colorant particles by heating at a temperature of from about 5° C. to about 15° C. about equal to, or about below the Tg of the latex polymer resulting in toner size aggregates of polymer and colorant particles, which particles are in the size range of from about 1.0 to about 5 microns in volume average diameter; thereafter adding an effective amount of anionic surfactant in the range amount of from about 0.01 to about 10 weight percent based on the amount of solids, and subsequently heating the resulting mixture at about equal to, or about above the polymer Tg enabling a breakdown of the aggregates into colorant particles in the size range of from about 0.3 to about 2 microns in volume average diameter.

2. A process in accordance with claim 1 wherein said organic phase is comprised of monomers of styrene/acrylates, said colorant is a pigment, and wherein said aqueous initiator solution of inorganic persulfate is added for the primary purpose of initiating polymerization, wherein the resulting latex contains styrene/acrylic and carboxylic acid, and the particles are in the size range of from about 0.08 to about 0.2 micron with a polymer $M_w$ molecular weight of from about 12,000 to about 60,000, with a polymer Tg of from about 30° C. to about 60° C.; and wherein said latex possesses colloidal properties and said breakdown of the aggregates is into pigmented particles in the size range of about 0.3 to about 1.5 microns.

3. A process in accordance with claim 1 wherein said monomers are styrene/butylacrylate containing carboxylic acids of acrylic acid in said nonionic/anionic surfactant solution, and wherein said submicron colorant particles are pigmented particles comprised of styrene/acrylate/carboxylic acid and pigment suspended in water containing anionic/nonionic surfactant.

4. A process in accordance with claim 1 wherein there results submicron colorant particles with excellent surface colloidal characteristics suitable for ink jet applications.

5. A process in accordance with claim 1 wherein the carboxylic acid amount is from about 3 to about 20 parts per hundred (pph) of the monomers; or wherein said carboxylic acid amount is from about 5 to about 20 parts (pph) of the monomers.

6. A process in accordance with claim 1 wherein said particles are comprised of polymer and colorant, with polymer being present in an amount of from about 90 to about 97 weight percent by weight of solids, and with colorant being present in amount from about 10 to about 3 weight percent by weight of solids, and wherein the colorant is a pigment.

7. A process in accordance with claim 1 wherein said semibatch polymerization process comprises (i) separating the oil phase comprising monomers of styrene/butylacrylate, and chain transfer agent and initiator into two portions into a reactor part and a feed part;

(ii) dividing into two portions, a reactor portion and a feed portion the aqueous phase, wherein the aqueous phase comprises anionic and nonionic surfactants, wherein the total surfactant concentration is in the range of from about 0.5 to about 10 weight percent of the weight of the monomers;

(iii) adding one portion of the oil phase, which in the range of from about 60 to about 80 weight percent of the total oil phase, to one portion of the aqueous phase, in the range of about 40 to about 80 weight percent of the weight of the aqueous phase, thereafter emulsifying the mixture for a period of from about 5 to about 60 minutes at a temperature of from about 20° C. to 40° C., resulting in an emulsified mixture of oil and aqueous phase;

(iv) adding a portion of an aqueous soluble initiator of potassium or ammonium persulfate to the reaction mixture; followed by further emulsification of the reaction mixture for a period of from about 5 to about 60 minutes at a temperature of from about 20° C. to about 40° C.;

(v) heating the resulting mixture (iv) to a temperature of about from about 60° C. to about 80° C.;

(vi) feeding a pre-emulsified mixture of the remaining portions of the oil phase to the reactor contents of (v), where the feeding of the oil/aqueous and the initiator phase is achieved over a period of about 30 minutes to about 4 hours; and (vii) further heating at a temperature of from about 60° C. to about 80° C. for a period of about 4 to about 6 hours, to complete the polymerization; and cooling.

8. A process in accordance with claim 7 wherein the reactor to feed ratio is from about 20 to about 60 percent of the total weight of the formulation of the monomer and the aqueous phase.

9. A process in accordance with claim 1 wherein the latex polymer is a styrene acrylate, styrene isoprene or a styrene methacrylate.

10. A process in accordance with claim 1 wherein the latex polymer is a styrene butylacrylate acrylic acid terpolymer.

11. A process in accordance with claim 10 wherein acrylic acid is in the range of from about 50 to about 90 weight percent based on the monomer weight.

12. A process in accordance with claim 1 wherein the partially soluble chain transfer agent is carbon tetrabromide and the ratio thereof to the carboxylic acid acrylic acid is in the range amount of from about 0.1 to about 2.0.

13. A process in accordance with claim 1 wherein the nonionic surfactant is an alkyl-polyethylene oxide with an alkyl chain of length of from about 10 to about 16 carbon atoms, and the polyethylene oxide has from about 20 to about 60 ethylene oxide segments.

14. A process in accordance with claim 1 wherein the anionic surfactant is a sodium salt of an alkyl sulfonic acid or alkyl benzyl sulfonic acid, and wherein the alkyl chain contains from about 10 to about 18 carbons.

15. A process in accordance with claim 1 wherein the anionic surfactant is linear or branched type.

16. A process in accordance with claim 1 wherein said polymer has a weight average molecular weight of from about 15,000 to about 40,000, and a number average molecular weight of from about 3,000 to about 5,000.

17. A process in accordance with claim 1 wherein the oil soluble initiator is VAZO 88 (2-2'-azobis isobutyramide dihydrate).

18. A process in accordance with claim 1 wherein the oil soluble initiator is VAZO 64, (2-methyl, 2-2'-azobis propanenitrile).

19. A process in accordance with claim 1 wherein the water soluble initiator is the inorganic persulfate of ammonium persulfate, sodium persulfate or potassium persulfate, and is selected in an amount of between about 0.2 to about 2 weight percent of the monomers.

20. A process in accordance with claim 1 wherein the polymer is selected from the group consisting of poly (styrene-butadiene), poly(para-methyl styrene-butadiene), poly(meta-methylstyrene-butadiene), poly(alpha-methylstyrene-butadiene), poly(methylmethacrylate-butadiene), poly(ethylmethacrylate-butadiene), poly (propylmethacrylate-butadiene), poly(butylmethacrylate-butadiene), poly(methylacrylate-butadiene), poly (ethylacrylate-butadiene), poly(propylacrylate-butadiene), poly(butylacrylate-butadiene), poly(styrene-isoprene), poly (para-methyl styrene-isoprene), poly(meta-methylstyrene-isoprene), poly(alphamethylstyrene-isoprene), poly (methylmethacrylate-isoprene), poly(ethylmethacrylate-isoprene), poly(propylmethacrylate-isoprene), poly (butylmethacrylate-isoprene), poly(methylacrylate-isoprene), poly(ethylacrylate-isoprene), poly (propylacrylate-isoprene), and poly(butylacrylate-isoprene); wherein the nonionic surfactant is selected from the group consisting of polyvinyl alcohol, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, and dialkylphenoxy poly(ethyleneoxy)ethanol; wherein the anionic surfactant is selected from the group consisting of sodium dodecyl sulfate, sodium dodecylbenzene sulfate, and sodium dodecylnaphthalene sulfate; wherein the colorant is carbon black, cyan, yellow, magenta, and mixtures thereof.

21. A process in accordance with claim 1 wherein the nonionic surfactant concentration is from about 0.1 to about 5 weight percent; the anionic surfactant concentration is about 0.1 to about 5 weight percent; and the cationic surfactant concentration is about 0.1 to about 5 weight percent of the toner components of resin, colorant and charge control agent.

22. A process in accordance with claim 1 wherein said carboxylic acid is covalently bonded to said polymer.

23. A process for the preparation of inks comprising (1) polymerizing an organic phase of monomer in the presence of a carboxylic acid, an oil soluble chain transfer agent, and a partially water soluble chain transfer agent; and which polymerizing is accomplished in the presence of (2) an aqueous phase containing a nonionic surfactant, and an anionic surfactant, and wherein there is added to the aqueous phase an aqueous initiator solution of an inorganic persulfate, and wherein the resulting latex contains particles of polymer with carboxylic acid; aggregating said latex particles with colorant; thereafter adding an effective amount of anionic surfactant and heating the mixture resulting about equal to, or about above the polymer Tg resulting from said monomer, or said monomers.

24. A process in accordance with claim 23 wherein said heating the mixture resulting enables a breakdown of the- aggregates formed into colorant particles in the size range of from about 0.3 to about 2 microns in volume average diameter.

25. A process in accordance with claim 1 wherein said polymer is a styrene/butylacrylate/acrylic acid and the colorant is selected from the group consisting of black, magenta, cyan, yellow, or mixtures thereof.

* * * * *